Aug. 24, 1937.  S. B. PAIGE  2,090,637
HYDRAULIC SEWAGE DISINTEGRATOR
Filed June 30, 1936  3 Sheets-Sheet 1
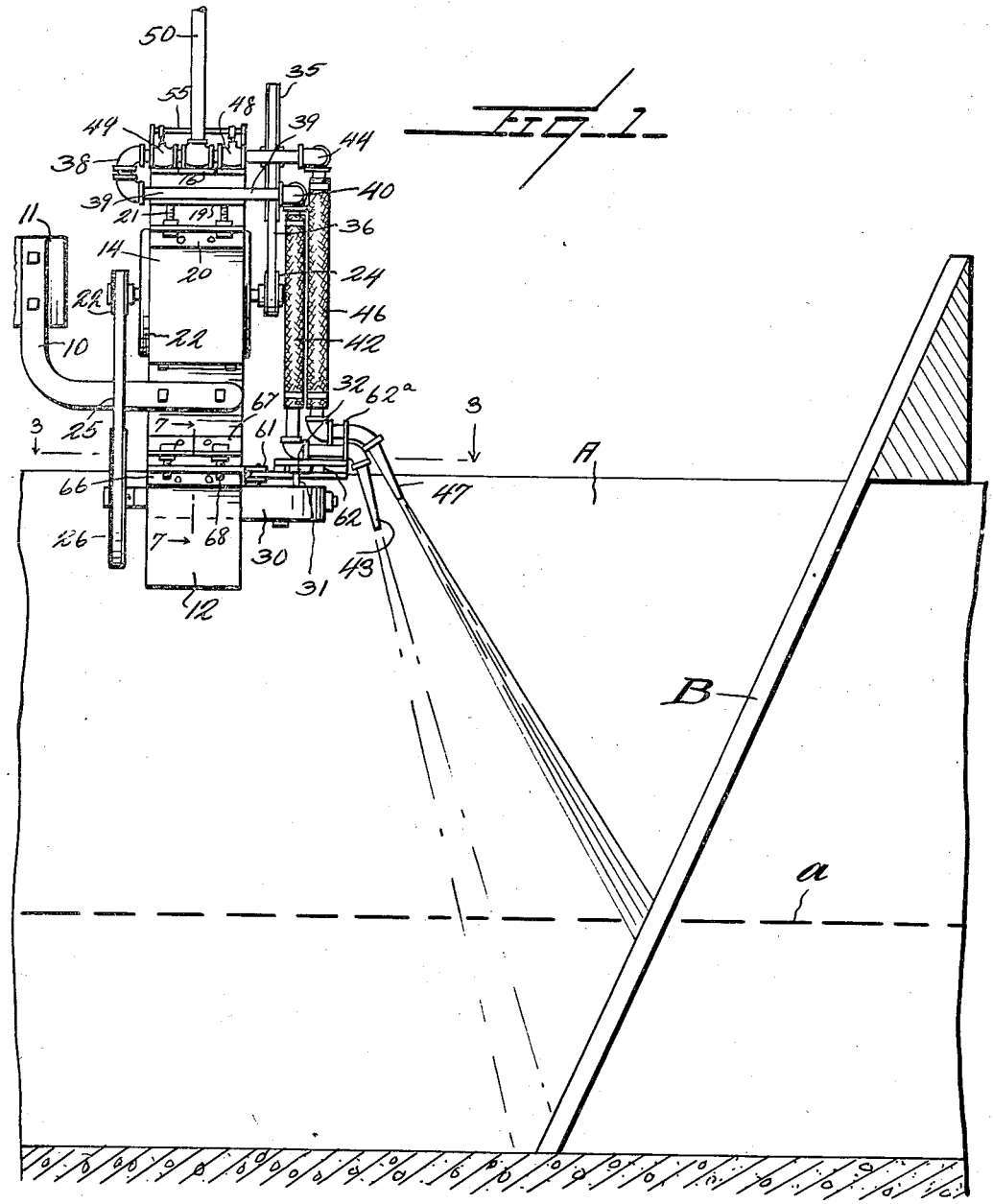
Inventor
S. B. Paige
By Watson E. Coleman
Attorney Aug. 24, 1937.  S. B. PAIGE  2,090,637
HYDRAULIC SEWAGE DISINTEGRATOR
Filed June 30, 1936  3 Sheets-Sheet 2
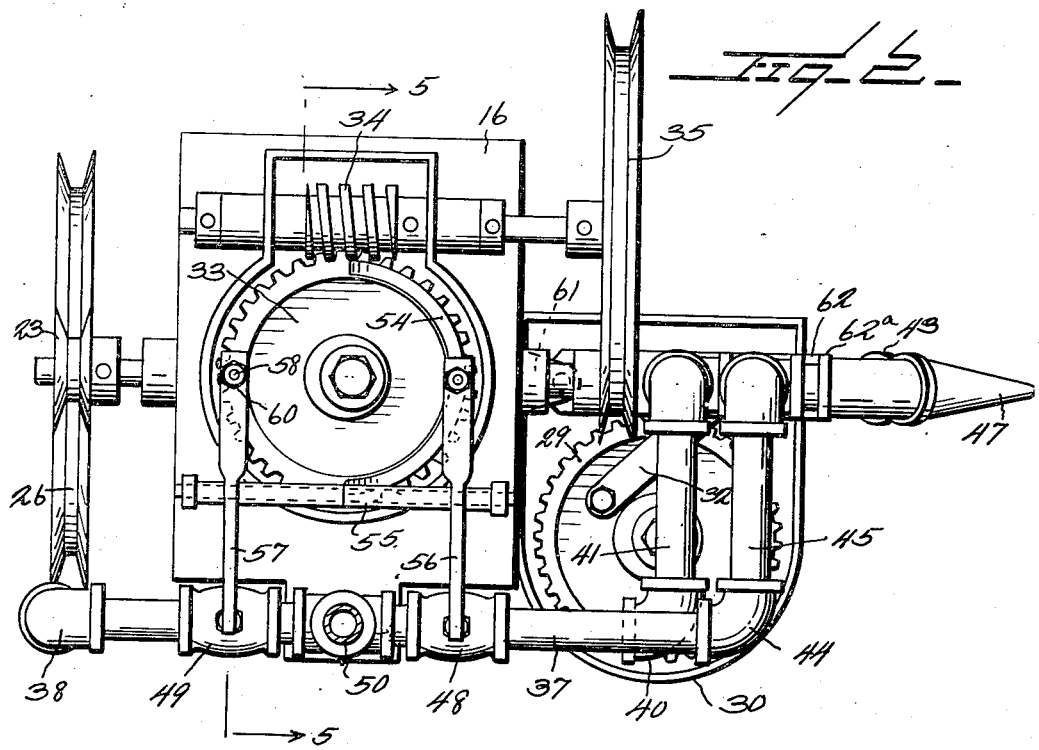
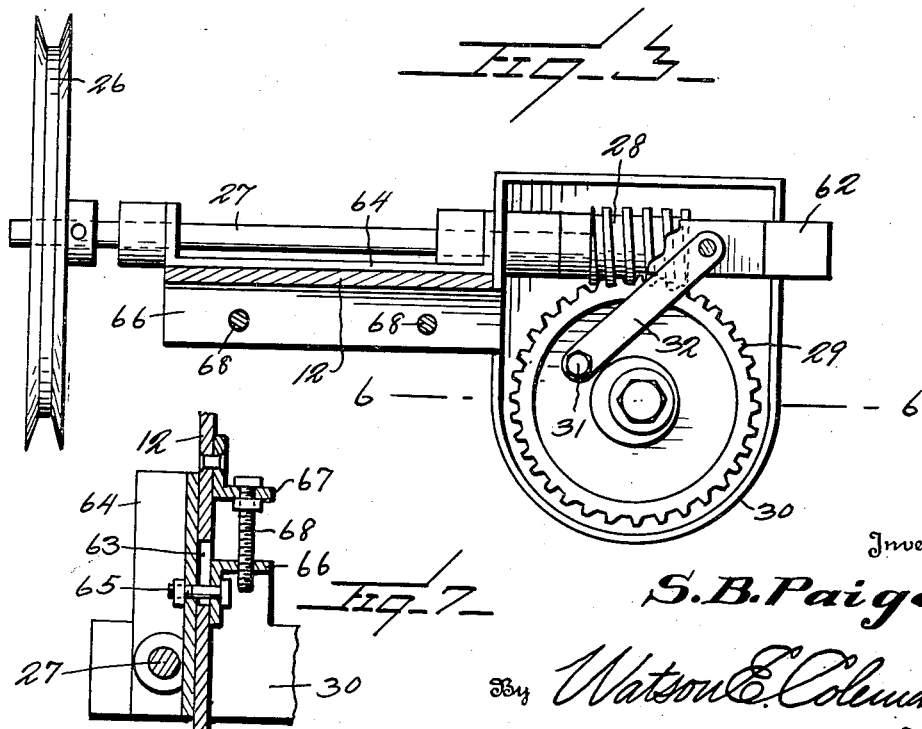
Inventor
S. B. Paige
By Watson E. Coleman
Attorney Aug. 24, 1937.  S. B. PAIGE  2,090,637
HYDRAULIC SEWAGE DISINTEGRATOR
Filed June 30, 1936   3 Sheets-Sheet 3
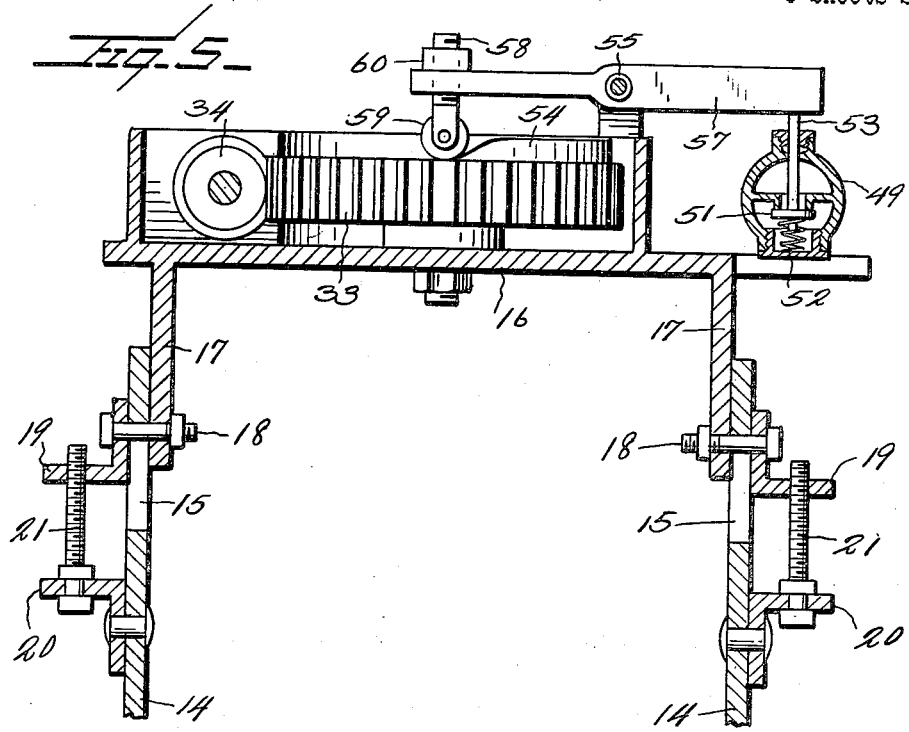
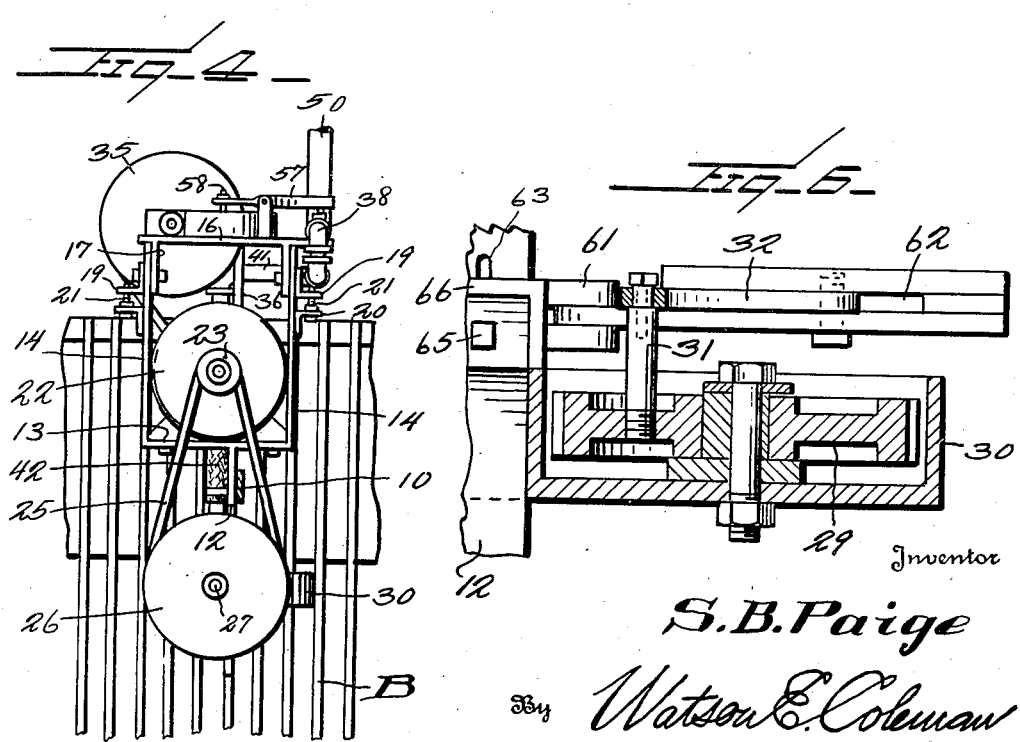

Patented Aug. 24, 1937

2,090,637

UNITED STATES PATENT OFFICE 2,090,637

HYDRAULIC SEWAGE DISINTEGRATOR

Samuel B. Paige, Baker, Oreg., assignor of one-fifth to Lawrence R. Martin, one-fifth to Walter L. Scott, and one-fifth to Forrest L. Hubbard, all of Baker, Oreg.

Application June 30, 1936, Serial No. 88,246

13 Claims. (Cl. 210—152)

This invention relates to sewage treatment and particularly to means for disintegrating sewage prior to its passage through a screen to the plant in which it is to be treated.

The general object of this invention is to provide means whereby the solids and semi-solids in the sewage may be broken up before passing through the sewage screen to a sewage handling plant.

A more specific object is to provide means for causing the stirring up of the solids at the bottom of a sewage stream just before it passes through the screen and for causing the breaking down or disintegration of these solids so stirred up and the driving of the disintegrated solids between the bars of the screen.

Generally speaking, this is accomplished by discharging a jet of water downward against the lower submerged end of the screen to thus stir up and agitate the solids at the bottom of the stream and prevent their becoming compacted and discharging a second jet of water downward against the screen at the surface of the sewage stream, this last named jet acting to break up the solids and semi-solids and drive them through the screen.

A further object is to provide means whereby these two streams of water may be caused to play across the stream or, in other words, oscillate transversely of the length of the stream, and a still further object is to provide means whereby the water discharged against the stream is economized by operating the nozzles which cause the discharge of the jets alternately so that the water consumption is only half as great as if the nozzles were operating at all times.

Other objects will appear in the course of the following description.

My invention is illustrated in the accompanying drawings wherein:

Figure 1 is a side elevation of my improved mechanism, the sewage canal being shown in elevation, the depth of the sewage stream being shown in dotted lines;

Figure 2 is a top plan view of my improved mechanism;

Figure 3 is a section on the line 3—3 of Figure 1;

Figure 4 is a rear elevation of the mechanism shown in Figure 1;

Figure 5 is a section on the line 5—5 of Figure 2;

Figure 6 is a section on the line 6—6 of Figure 3;

Figure 7 is a section on the line 7—7 of Figure 1.

Referring to these drawings, A designates a sewage canal sluiceway or the like, and B screen bars extending downward at an inclination to the surface $a$ of the sewage stream. Supported in any suitable manner in association with the sewage canal A is a bracket 10, which is shown as mounted upon a support 11. This bracket 10 is riveted or bolted to a downwardly extending supporting bar 12 which extends downward from a horizontal supporting bar 13 having upwardly extending end portions or uprights 14. These uprights adjacent their upper ends are vertically slotted, as at 15, for a purpose to be later described, and these uprights support a horizontally disposed platform or plate 16 having downwardly extending legs 17. Bolts 18 pass through the lower ends of these legs 17 and through the slots 15, as shown in Figure 5, and these bolts carry the angle irons 19. Angle irons 20 are also bolted to the uprights 14 and adjusting screws 21 pass through these fixed angle irons 20 into the angle irons 19 to thus permit the platform 16 to be adjusted vertically.

Mounted upon the frame thus formed and between the uprights 14 is a motor designated generally 22, which may be an electric motor, the shaft of which carries two pulleys 23 and 24. From the pulley 23 extends a belt 25 over a pulley 26 mounted upon a shaft 27, as shown in Figure 3, supported in bearings on the depending bar 12. This shaft carries upon it a worm 28, as shown in Figure 3, which engages a worm wheel 29 disposed within a housing 30. Mounted above this worm wheel is a swinging nozzle as will be later described, and the worm wheel is connected by a crank pin 31 to a link 32, which in turn is connected to the nozzle. As the worm wheel 29 rotates, the connected nozzle will be oscillated.

Mounted upon the plate or platform 16 is a worm wheel 33 engaged by a worm 34, the shaft of which is mounted in suitable bearings upon the plate 16 and this shaft carries the pulley or band wheel 35. A belt 36 engages this wheel 35 and also engages the pulley 24 previously referred to as being on the motor shaft.

Operatively supported upon the plate 16 is a transversely extending header or pipe 37, which is shown in Figure 1, and at one end is connected by L's 38 to a pipe 39, which in turn is connected by an L 40 to a transversely extending pipe 41 which in turn is connected to a vertically extending hose section 42. This at its lower end is operatively connected by pipe sections to a nozzle 43 which is directed downward and toward the lower end of the screen B. The header or pipe line 37 is also at its end remote from the L 38 connected by an L 44 to a transversely extending pipe 45 in turn connected at its end to a downwardly extending hose section 46 corresponding to the hose section 42 and this in turn is connected by pipe sections to the downwardly extending nozzle 47 which is directed at the intersection of the sewage line A with the screen B. Valves 48 and 49 are disposed on each side of a supply pipe 50 which extends from any suitable source of supply to the header 37. The valve casings 48 and 49 may have valves therein of any suitable character but I have illustrated in Figure 5 one of these valves, as the valve within the casing 49, as being a depressible valve, the valve proper being designated 51, depressible against the action of a spring 52 and normally held closed by this spring. The valve casing 48 contains a like valve. Both of these valves are provided with upwardly extending stems 53.

For the purpose of alternately depressing the stems of these two valves or alternately opening and closing these valves, I mount upon the plate 16 the worm wheel 33, as before described, and form the upper face of this worm wheel with an upwardly extending cam 54 which extends through an arc of 180°. Pivotally mounted upon transversely extending sleeves 55 are the valve actuating tappets 56 and 57, these tappets being alike but one actuating the stem of the valve casing 49 and the other the stem of the valve casing 48. When the cam 54 strikes one of these tappets, the rear end of the tappet is raised and the forward end of the tappet is lowered, opening the corresponding valve while the valve of the other valve casing remains closed. Each of these tappets 56 and 57 is provided, as shown in Figure 5, with a screw threaded stem 58 upon which is mounted the roller 59 which operates upon the cam track 54. The stem is adjustable through the tappet, as shown in Figure 5, and is held in adjusted position by means of the nut 60.

For the purpose of swinging the nozzles 43 and 47 together transversely across the sewage stream and transversely of the screen B, I pivot upon an ear 61 projecting from the supporting frame of the machine an arm 62, which carries at its outer end an upwardly extending lug 62a, through which the pipe sections which connect the nozzles 43 and 47 to the flexible hose 42 and 46 pass, as shown in Figure 1. This arm 62 is connected by the link 32 previously described, to the crank pin 31 of the worm wheel 29. Thus as this worm wheel rotates, the arm 62 will be swung transversely of the stream of sewage and will carry the nozzles 43 and 47 with it. Thus the streams or jets directed from the nozzles will sweep across the stream of sewage. The nozzle 43 will discharge a powerful stream or jet of water downward into the sewage stream and against the bottom of the canal A adjacent the lower end of the screen B while the nozzle 47 will direct a powerful stream of water against the sewage stream at its surface and at a point adjacent the intersection of the surface a of the stream with the screen B, as shown in Figure 1. The supply pipe 50 will be connected to a source of water under pressure, as for instance, to a pump so that a powerful jet of water will be directed from each of the nozzles 43 and 47.

For the purpose of keeping the belt 36 taut, I mount the plate 16 upon the uprights 14, as heretofore described and as illustrated in Figure 5, so that as the belt 36 slackens through use or for any other reason, the platform or plate 16 may be raised to thus tighten the belt. A like construction is used for supporting the shaft 27 so that this shaft may be adjusted vertically to tighten the belt passing around the plate 26. To this end, as shown in Figure 7, the downwardly extending bar or plate 12 is slotted at 63. A bracket 64 having bearings for the shaft 27 and carrying the housing 30 is supported against this plate or bar 12 by means of a bolt 65 passing through the slot 63 and through an angle iron 66, which is the equivalent of the angle iron 19. An angle iron 67 is riveted, bolted or otherwise attached to the web or bar 12 and an adjusting screw 68 is swivelled in this angle iron just as the adjusting screws 21 are swivelled in the angle irons 20, and has screwthreaded engagement with the angle irons 66. Thus both belts may be tightened from time to time as found necessary. The supply pipe 50 is connected not only to a source of water under pressure but to a source of water having a certain alkaline content whereby the acid in the raw sewage is diluted.

In the operation of this structure, assuming that the motor 22 is running, then it will be obvious that the cam 54 will alternately open the valves in the valve casings 48 and 49 and that while the nozzles are moving in one direction transversely of the stream of sewage, one of these valves will be opened and a stream will be directed out through the corresponding nozzle and upon a reverse movement of the nozzles across the stream of sewage, the first-named valve will be closed and the second-named valve opened. Satisfactory results could be obtained if both nozzles were operated at the same time, but equally satisfactory results are obtained by operating the nozzles alternately, and under these circumstances, the water consumption is only half as great. The water jet discharged from the nozzle 47 performs the greater portion of the actual breaking down of the solids, and drives the broken down solids between the bars of the screen B. The jet 43 operates at the bottom of the sewage flow and acts to stir up the solids and cause them to come to the surface so that the upper jet may act upon them. These two jets, therefore, prevent the accumulation of solids at the bottom of the sewage stream and cause the breaking up of these solids and their passage through the screen to the plant where they are to be treated. Without the use of this mechanism, so much of the materials found in raw sewage is taken out of the screen, that there is not a sufficient amount of material flowing into the digester, so that the digester may work with its best efficiency. Ordinarily, it is necessary, therefore, that an operator with a rake be stationed by the screen to continually stir up and agitate the sewage and rake the screen clear. This is entirely obviated by my mechanism. By the use of this mechanism, everything can be broken up into pieces before it passes into the digester and only such articles as cannot be broken up, such as pieces of cloth, wood, iron, etc., are taken out of the screen. My mechanism increases the efficiency of the digester by about 95% and thus increases the efficiency of the entire plant.

The advantages secured in the operation of the sewage disposal plant by the use of my mechanism are as follows:

First, increase of gas production 100%.

Second, elimination of 95% of the material that could not otherwise be handled in the plant.

Third, it eliminates the necessity of an operator to watch and tend the screen.

Fourth, it disintegrates the sewage so that when it comes into the digester, it will be digested in half the time required where this mechanism is not in use.

Fifth, any alkali in the additional water added to the sewage through this mechanism dilutes the acid in the raw sewage to such an extent that it promotes the process of digestion and makes it quicker, more thorough and more efficient and makes this digestion much more complete.

While I have illustrated certain details of construction and certain definite arrangement of parts which I have found to be particularly effective, I do not wish to be limited to these details as it is obvious that many changes might be made therein without departing from the spirit of the invention as defined in the appended claims.

What is claimed is:—

1. The combination with a sludge screen, of means for disentegrating the solids in a sewage stream just prior to its passage through the screen, including means for discharging a jet of water at high pressure downward into said stream, and means for causing said jet to reciprocate transversely of the stream.

2. The combination with a sludge screen, of means for disintegrating the solids in a sewage stream just prior to its passage through the screen, including means for discharging two jets of water under high pressure downward into said stream, one of said jets being directed to the intersection of the surface of the stream with the screen, the other of said jets being directed so as to strike the bottom of the stream approximately at its intersection with the screen, and means for reciprocating said jets across the stream.

3. The combination with a sewage canal having a downwardly inclined screen, of means for directing two jets of water under high pressure downward into said stream, one of said jets being so directed as to strike the surface of the stream approximately at the intersection of the surface of the stream with the screen, the other of said jets being directed toward the intersection of the lower end of the screen with the bottom of the stream, and means for reciprocating said jets transversely across the stream.

4. The combination with a sludge screen, of means for disintegrating the solids in a sewage stream just prior to its passage through the screen, including a supporting frame, a motor thereon, a pair of downwardly directed nozzles having angular relation to each other in a vertical plane, means driven by the motor for oscillating said nozzles in a horizontal plane, and means for operatively connecting said nozzles to a source of water under high pressure.

5. The combination with a sludge screen, of means for disintegrating the solids in a sewage stream just prior to its passage through the screen, including a supporting frame, means for supporting said frame above the surface of the sewage stream, a pair of downwardly directed nozzles operatively supported by said frame, the nozzles having angular relation to each other in a horizontal plane whereby the jets discharged from said nozzles will strike the stream at different angles, a supply pipe operatively connected to each of said nozzles and adapted to be connected to a source of water under pressure, a motor carried by the supporting frame, and means driven by said motor for oscillating said nozzles transversely of the stream.

6. The combination with a sludge screen, of means for disintegrating the solids in a sewage stream just prior to its passage through the screen, including a supporting frame, means for supporting said frame above the surface of the sewage stream, a pair of downwardly directed nozzles operatively supported by said frame, the nozzles having angular relation to each other in a horizontal plane whereby the jets discharged from said nozzles will strike the stream at different angles, a supply pipe operatively connected to each of said nozzles and adapted to be connected to a source of water under pressure, a motor carried by the supporting frame, means driven by said motor for oscillating said nozzles transversely of the stream, said means including a worm operatively connected to and driven by the motor, a worm wheel engaged with the worm, a link pivoted to the worm wheel, and an arm pivoted at one end to the frame and at its free end operatively connected to said nozzles, the link being pivotally connected to said arm.

7. The combination with a sludge screen, of means for disintegrating the solids in a sewage stream just prior to its passage through the screen, including a frame adapted to be supported above the surface of the stream, a pair of downwardly directed nozzles operatively supported by said frame for oscillation in a horizontal plane, said nozzles having angular relation to each other in a vertical plane, a header having means for connecting it to a source of water under pressure, one end of said header being operatively connected to one nozzle and the other end of the header being operatively connected to the other nozzle, valves in said header on each side of the supply pipe, a motor supported by the frame, means operatively connected to the motor for oscillating the nozzles in a horizontal plane, and means for alternately operating said valves, including a cam, means connected to the motor for rotating said cam and tappets alternately engaged by the cam, one of said tappets being connected to each of the valves.

8. A mechanism of the character described, including a supporting frame, a motor supported by the frame, a header carried by the frame, a supply pipe connected to the header and adapted to connect the header with a source of water under high pressure, pipes extending from opposite ends of the header, vertical flexible hose sections connected to said last-named pipes, a pair of nozzles connected to the lower ends of the hose sections and directed downward, said nozzles having angular relation to each other in a vertical plane, valves disposed one on each side of the supply pipe, means operated by the motor for alternately opening one or the other of said valves, and means operated by the motor for oscillating said nozzles in a horizontal plane.

9. A mechanism of the character described, including a supporting frame, a header carried by the upper end of said frame, a supply pipe connected to the header and adapted to be connected to a source of water under high pressure, pipe connections leading from the opposite ends of the header, hose pipes disposed in parallel relation to each other and connected to said last-named pipe connections, downwardly extending nozzles operatively connected to the lower ends of the flexible hose pipes, said nozzles being disposed at an acute angle with relation to each other, valves disposed in said header on each side of the supply pipe, each valve being vertically depressible to permit the discharge of water through the corresponding end of the header, a motor carried by the supporting frame, a worm driven by the motor, a worm wheel engaged with the worm and having a cam track upon one surface, tappets one for each of said valves and adapted to be engaged by said cam to alternately open one or the other of said valves, and means driven by said motor for oscillating the nozzles and operatively connected thereto, said means acting when one valve is open to shift the nozzles in one direction across the stream and acting when the other valve is opened to shift the nozzles in an opposite direction across the stream.

10. A mechanism of the character described, including a supporting frame, a header carried by the upper end of said frame, a supply pipe connected to the header and adapted to be connected to a source of water under high pressure, pipe connections leading from the opposite ends of the header, hose pipes disposed in parallel relation to each other and connected to said last-named pipe connections, downwardly extending nozzles operatively connected to the lower ends of the flexible hose pipes, said nozzles being disposed at an acute angle with relation to each other but both of said nozzles being disposed in vertical plane, valves disposed in said header on each side of the supply pipe, each valve being vertically depressible to permit the discharge of water through the corresponding end of the header, a motor carried by the supporting frame, a worm driven by the motor, a worm wheel engaged with the worm and having a cam track upon one surface, tappets one for each of said valves and adapted to be engaged by said cam to alternately open one or the other of said valves, means driven by said motor for oscillating the nozzles and operatively connected thereto, said means acting when one valve is open to shift the nozzles in one direction across the stream and acting when the other valve is opened to shift the nozzles in an opposite direction across the stream, and including a worm operatively connected to and driven by the motor, a worm wheel, pivoted arms supporting the nozzles, and a link between the worm wheel and said arms.

11. In a mechanism of the character described, including a supporting frame, a motor carried thereby, the shaft of the motor having pulleys at each end, a plate supported upon said frame at its upper end for vertical adjustment, a header carried by said plate, a supply pipe connected to the header at its middle and adapted to be connected to a source of water under pressure, valves in said header on each side of the supply pipe, vertically disposed parallel flexible pipes operatively connected to opposite ends of the header, downwardly directed nozzles carried at the lower ends of said flexible pipes and disposed in angular relation to each other in a vertical plane, a valve actuating cam mounted upon said plate, tappets alternately engaged by said cam and connected to the respective valves to open them upon the engagement of the corresponding tappet by said cam, means for rotating said cam including a pulley, an operative connection between one of said pulleys on the motor and said last-named pulley, means carried by said frame for oscillating the nozzles including a shaft carrying a pulley and a worm, a support for said shaft vertically adjustable upon the frame, a worm wheel carried by said support and engaged by said worm, an arm pivotally mounted upon the support and engaged with both of said nozzles, and a link connecting the worm wheel with said arm to oscillate it in a horizontal plane.

12. The method of disintegrating the solids in a sewage stream just prior to its passage through a screen which includes discharging a jet of water under high pressure against the surface of the stream at the point of intersection of said surface with the screen, and discharging a second jet of water at high pressure downward into and through the sewage stream and against the bottom of the stream adjacent the lower end of the screen.

13. The method of disintegrating the solids in a sewage stream just prior to its passage through a screen which includes discharging a jet of water under high pressure and having an alkaline content against the surface of the stream at the point of intersection of said surface with the screen and discharging a second jet of water under pressure and having an alkaline content downward into and through the sewage stream and against the bottom of the stream adjacent the lower end of the screen.

SAMUEL B. PAIGE.